United States Patent [19]
Hellebusch

[11] 3,753,270
[45] Aug. 21, 1973

[54] FISH AND GAME HOLDING BOARD
[76] Inventor: Werner J. Hellebusch, Rt. 2, Box 30, Marthasville, Mo. 63367
[22] Filed: Sept. 7, 1971
[21] Appl. No.: 178,181

[52] U.S. Cl. .................................... 17/70, 17/44.3
[51] Int. Cl. ............................................ A22c 25/00
[58] Field of Search ............................ 17/70, 44.3

[56] References Cited
UNITED STATES PATENTS
2,945,256   7/1960   Harper ................................. 17/70
1,632,194   6/1927   Possehl ................................ 17/70
3,016,565   1/1962   Hill ..................................... 17/70

Primary Examiner—Louis G. Mancene
Assistant Examiner—D. L. Weinhold
Attorney—Cohn, Powell & Hind

[57] ABSTRACT

This holding board includes a base frame having parallel sides supporting a removable platform therebetween. The arms of a U-shaped clamping frame are pivotally connected to the sides of the base frame for angular movement of the clamping frame toward the base frame. A clamping bar extends between the arms of the clamping frame and is adapted to clamp fish to the platform. One of the sides of the base frame and an associated arm of the clamping frame provide scissor action cutting edges for sectioning fish and game. The base frame and the clamping frame include selectively spaced hooks which are attachable to opposite ends of a carcass to extend said carcass for skinning.

5 Claims, 4 Drawing Figures

Patented Aug. 21, 1973
3,753,270
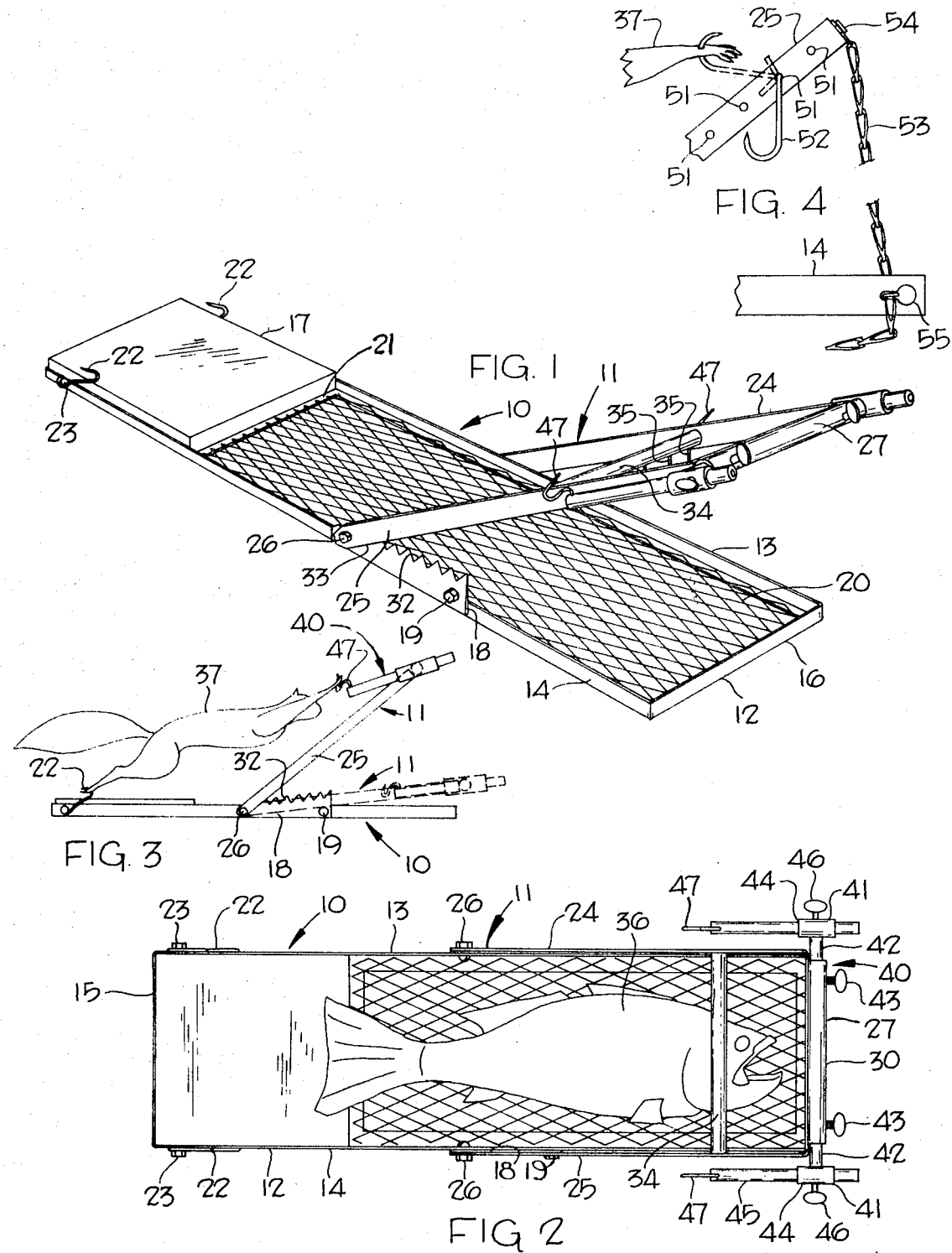
Inventor
WERNER J. HELLEBUSCH
By Cohn, Powell + Hind
Attorneys

FISH AND GAME HOLDING BOARD

BACKGROUND OF THE INVENTION

This invention relates in general to a portable device for holding fish and game carcasses and particularly to a device for facilitating clamping, cutting and skinning operations in the field.

It is common practice for sportsmen to prepare fish and game for cooking and various devices have been developed to facilitate this preparation. For example, descaling apparatus is known by which the fish tail is held between wooden blocks while the descaling proceeds. In one such device spring pressure is used to clamp the fish tail and in another a camming means is used. Unfortunately, such devices lack versatility and are not useful for handling game.

Skinning devices for game are also known but such devices, in effect, merely provide hangers of various designs from which the game carcass is suspended during the skinning operation. With such devices the carcass is not laterally secured during the skinning operation. Again, the versatility of these devices is limited.

Also known in the art are devices which incorporate a side-mounted knife. However, unitary blades of the type currently used lack the structural integrity necessary for heavy use and are susceptible to breakage.

No known device provides a structure having interrelated parts which permit clamping, cutting and also skinning operations and which are useful for both fish and game.

SUMMARY OF THE INVENTION

This holding board provides a versatile, folding frame structure capable of clamping and severing fish and game carcasses, and of conditioning small game for skinning. A removable, expanded metal grid provides a platform and facilitates cleaning of the device after use.

The device includes a base frame, having opposed side members, and a U-shaped clamping frame, having opposed arm members which are pivotally connected to said side members for angular movement of the bight member toward the base frame.

One of the sides members of the base frame includes a cutting element having a cutting edge and one of the arm members of the clamping frame includes a cooperating cutting edge movable in scissors relation about the clamping frame pivot axis to sever selected carcass portions. The base frame includes a removable metal grid providing a platform and a clamping bar provided with points extends between the clamping frame arm members to facilitate the clamping of fish between the clamping frame and the platform. The arm members of the clamping frame are disposed outwardly of the side members of the base frame and the clamping frame is engageable with an outstanding portion of the base frame to provide a stop means precluding rotation of the clamping frame beyond the base frame to facilitate the clamping and cutting actions.

The base frame includes hook means at one end and the clamping frame includes an adjustable hook assembly attached to the bight member. The spacing between associated hooks on each frame increases as the clamping frame is moved toward the base frame whereby to apply tension to a carcass extended between said frames and thereby facilitate skinning. Connection means extending between the frames selectively precludes rotation of the clamping frame away from the base frame during skinning.

This holding device is relatively inexpensive to manufacture. It is simple to operate and easy to clean and is portable to facilitae use in the field.

BRIEF DESCRIPTION OF THE DRAWING:

FIG. 1 is a perspective view of the holding board illustrating the clamping frame in a raised position;

FIG. 2 is a plan view of the clamping board;

FIG. 3 is an elevational view illustrating the disposition of a carcass in an extended condition for skinning; and FIG. 4 is a fragmentary elevational view illustrating a modified structure.

DESCRIPTION OF THE PREFERRED EMBODIMENTS:

Referring now by characters of reference to the drawing and first to FIG. 1 it will be understood that the holding board includes a base frame 10, constituting a first framing means, and a clamping frame 11, constituting a second framing means. The clamping frame 11 is pivotally attached to the base frame 10 for angular movement relative to said base frame 10.

The base frame 10 includes an open framework 12 formed from elongate members of angular cross section including parallel side members 13 and 14 and parallel end members 15 and 16. At one end the base frame 10 is provided with a wood cutting block 17 which is secured to the open framework 12. The remaining area of the open framework 12 is occupied by an expanded metal grid 20, constituting a platform means. The grid 20 is supported along its length, and at one end, by the side members 13 and 14 and end member 16 respectively. It is supported along its other end by an intermediate member 21 connected between said side members 13 and 14 as by welding. At its far end the base frame 10 includes a pair of hooks 22, constituting a first hook means, which are pivotally connected to the side members 13 and 14 by means of fasteners 23. A sawtooth cutting element is attached to side member 14 and a nut 19, constituting a stop means, projects outwardly from said cutting element 18.

The clamping frame 11 is formed from a substantially U-shaped strap to provide a pair of parallel side arm members 24 and 25, pivotally connected to associated base frame side members 13 and 14 by means of fasteners 26, and a bight member 27. A tubular member 30 is attached to the bight member 27 as by welding.

It will be readily understood that by grasping the bight member 27 the clamping frame 11 may be angularly rotated about the pivot axis of the fasteners 26. This structural arrangement of parts provides a scissor action between the side arm members 24 and 25 of the clamping frame and the side members 13 and 14 of the base frame 10. In order to effectuate a superior cutting action between the base frame 10 and the clamping frame 11 the cutting element 18 is provided with an inclined shearing edge 32 which cooperates with the complementary lower edge 33 of the clamping frame side arm member 25 to provide a knife or guillotine action between said shear cutting edges. It will be understood that this knife action is particularly effective because of the stability of the double pivot connection of the clamping frame 11 and is eminently suitable for severing the carcasses of fish or game into sections.

The clamping frame 11 includes a clamping bar 34 which extends between the side arm members 24 and 25 and is welded or otherwise attached thereto. The clamping bar 34 is provided with a plurality of downward projecting points 35 by which the clamping bar 34 may be used to provide a holding means to secure a carcass, such as the fish indicated in dotted outline by numeral 36, to the grid 20. As indicated in FIG. 3 the stop nut 19 projecting from the cutting element 18 provides a stop means limiting clockwise rotation of the clamping frame 11. In the stop position the inclination of the clamping frame 11 is substantially parallel with the inclination of the sawtooth cutting edge 32 and the side member 25 overlaps the cutting element 18. This structural arrangement of parts also predetermines the degree of penetration of the points 35 and insures non-interference of said points with the grid 20. The diamond formations of said expanded metal grid 20 provide a non-slip surface which further facilitates the holding action of the clamping bar 34.

In order to provide a means of holding the carcasses of small game in a substantially stretched condition to facilitate skinning the clamping frame 11 is provided with an adjustable hook assembly 40 constituting a second hook means. As shown in FIG. 3, the hooks 47 of this assembly 40 cooperate with the hooks 22 on the base frame 10 to hold the carcass in extended relation between opposite ends of the device.

The hook assembly 40 is pivotally connected to the tubular member 30 attached to the bight member 27 of the clamping frame 11. The assembly 40 includes a pair of opposed T-shaped pivot elements 41 each having a stem 42 slidably receivable within the tubular member 30 and selectively secured therein by means of thumb screws 43. The head 44 of each pivot element 41 is of tubular configuration to receive a compatible configurated element 45 in telescopic relation, said finger elements 45 being selectively secured by means of thumb screws 46. Each finger element 45 has one of the hooks 47 fixed to its remote end and, by aligning the finger elements 45 in the general direction of the base hooks 22, the carcasses of small game, such as the squirrel 37, may be stretched between the base frame 10 and the clamping frame 11 and tensioned as desired for skinning or other purposes by urging the clamping frame 11 toward the base frame 10. It will be understood that the weight of the clamping frame 11 tends to stretch the said carcass 37 and that the tensioning force is increased considerably by urging the clamping frame 11 downwardly because the spacing between the hooks 22 and 47 increases as the clamping frame 11 approaches said base frame 10. In addition, the inclined disposition of the carcass renders it more easily accessible and considerably facilitates the skinning operation.

A modified hook assembly 50 is indicated in FIG. 4. In this assembly 50 a plurality of aligned apertures 51 is provided in each clamping frame side member 24 and 25. Matched pairs of hooks 52 are removably connected to selected pairs of apertures 51 the selection depending on the size of the carcass.

FIG. 4 also indicates a means of selectively connecting the base frame 10 and the clamping frame 11 together to preclude counterclockwise rotation of the clamping frame 11 and to maintain the carcass 37 in a stretched condition. In FIG. 4 the connection means is provided by a pair of chains 53 connected to associated studs 54 on the clamping frame 11 at the upper end and selectively receivable within keyhole slots 55 provided in the base frame side members 13 and 14.

It is thought that the structural features and functional advantage of this holding board have become fully apparent from the foregoing description of parts but for completeness of disclosure the use of the device will be briefly summarized.

The device may be used in the skinning of small game such as squirrels, rabbits and the like and may be used also to effectively hold fish during descaling and fileting operations. The provision of the stabilized, guillotine or knife action is particularly effective in fileting and sectioning operations.

It will be clear from FIG. 2 that a fish may be securely held while it is worked on by simply placing it on the grid 20 and by rotating the clamping bar 34 downwardly so that the points 37 pierce the head or tail of the fish and hold it securely in place on the relatively rough face of the grid 20. When desired the head and tail may be readily removed by placing these portions across the knife edge 32 and executing a sweeping guillotine movement of the clamping frame 11 toward the base frame 10 so that the knife edges 32 and 33 pass each other in the manner of scissor blades.

It will be understood that because of the pivotal and geometrical relationship between the clamping frame 11 and the base frame 10 a point at one end of the clamping frame 11, which is rotated toward the base frame 10 moves lengthwise of the base frame 10 away from other end of said base frame. Thus, as the clamping frame 11 is rotated toward the base frame 10, holding means on the clamping frame 11, such as the hooks assembly 40 and the clamping bar 34, tend to move outwardly lengthwise of the base frame 10. When it is desired to secure small game for skinning purposes the rear paws of the carcass may be held by hooks 22 and the fore paws by hooks 47. This arrangement in which the carcass 37 is raised above the grid 20 for skinning is shown in FIG. 3 and it will be understood that the hook assembly finger element 45 can be oriented as desired for the most effective stretching action of the carcass 37. The finger elements 45 are telescopically adjustable both lengthwise and transversely of the frame 11 and this feature provides a considerable versatility in the positioning of the carcass for the skinning operation. If desired the stretching action can be increased by simply urging the clamping frame 11 toward the base frame 10 by pushing down on the bight member 27. This action results in an increase in the distance between the hooks 22 and 47 and a consequent increase in the pull on the carcass.

When the clamping frame 11 is in the closed, inoperative condition in which the side member 25 engages the nut 19 and overlaps the cutting element 18 the side member 25 provides an effective guard for said cutting element.

I claim as my invention:

1. A holding board for fish and game carcasses, comprising:

a. a first framing means including platform means, opposed, substantially parallel sides and opposed ends, b. a second framing means including a pair of opposed, substantially parallel and interconnected arms each arm being pivotally connected to an associated side of the first framing means at one end about a substantially perpendicular pivot axis for angular movement of the arms about the pivot axis, and c. holding means including a clamping member extending between said arms and disposed in spaced relation from said pivot axis and movable toward the platform means to clamp a carcass on said platform means.

2. A holding board as defined in claim 1, in which:
d. the first framing means includes interconnected side members disposed in spaced, side-by-side relation and including inwardly extending seating portions,
e. the platform means includes a removable open grid supported by said seating portions,
f. the clamping member is provided by a bar rigidly attached to the arms and having transversely projecting points, and
g. the arms are interconnected by a bight member spaced from the clamping bar and providing a handle adapted to urge the clamping bar points into a carcass on said open grid.

3. A holding board for fish and game carcasses, comprising:
a. a first framing means including opposed substantially parallel side members, opposed end members and platform means disposed between said side members,
b. a second, substantially U-shaped framing means including a bight member and opposed substantially parallel arm members pivotally connected to associated side members of the first framing means about a substantially perpendicular pivot axis for angular rotation of the second framing means toward the platform means, and
c. one of the side members of the first framing means includes a knife edge and one of the arm members of the second framing means includes a coacting knife edge, said edges being movable into overlapping guillotine relation about the pivot axis as both arms are urged toward associated side members.

4. A clamping board as defined in claim 3, in which:
d. one of said side members includes an elongate toothed element providing an inclined knife edge, and
e. stop means is provided between the first and second framing means to limit the angular rotation of the U-shaped framing means when said arm members are substantially parallel with the inclined edge whereby one of the parallel arm members provides a guard for the knife edge.

5. A holding board as defined in claim 3, in which:
d. the first framing means includes first hook means spaced from the pivot axis and adapted to be attached to one end of a carcass, and
e. the second framing means includes second hook means spaced from the pivot axis and adapted to be attached to the other end of the carcass,
f. the distance between said first and second hook means increasing as the second framing means approaches the first framing means whereby to stretch said carcass.

* * * * *